(12) United States Patent
Moore

(10) Patent No.: US 12,738,393 B2
(45) Date of Patent: Sep. 15, 2026

(54) CONTINUOUSLY GROUNDED TRAVEL GATE SYSTEM, BARRIER SYSTEM AND RELATED METHODS

(71) Applicant: Vanquish Fencing, Inc., Morrisville, PA (US)

(72) Inventor: Donald E. Moore, Morrisville, PA (US)

(73) Assignee: Vanquish Fencing, Inc., Morrisville, PA (US)

( * ) Notice: Subject to any disclaimer, the term of this patent is extended or adjusted under 35 U.S.C. 154(b) by 1138 days.

(21) Appl. No.: 16/901,607

(22) Filed: Jun. 15, 2020

(65) Prior Publication Data

US 2021/0062578 A1 Mar. 4, 2021

Related U.S. Application Data

(60) Provisional application No. 62/861,081, filed on Jun. 13, 2019.

(51) Int. Cl.

| | |
|---|---|
| ***H01B 7/04*** | (2006.01) |
| ***E06B 11/02*** | (2006.01) |
| ***H01H 83/02*** | (2006.01) |
| ***H02G 3/00*** | (2006.01) |

(52) U.S. Cl.

CPC .............. *H01B 7/041* (2013.01); *E06B 11/02* (2013.01); *H01H 83/02* (2013.01); *H02G 3/263* (2013.01); *E06B 11/026* (2013.01); *H01H 2239/018* (2013.01)

(58) Field of Classification Search

CPC ....... H01B 7/041; E06B 11/02; E06B 11/045; E06B 11/026; H01H 83/02; H01H 2239/018; H02G 3/263; H01R 4/646

See application file for complete search history.

(56) References Cited

U.S. PATENT DOCUMENTS

| | | | | |
|---|---|---|---|---|
| 9,045,928 | B1 * | 6/2015 | Seitz | E05F 15/59 |
| 9,587,432 | B1 * | 3/2017 | Valdez | E05F 17/004 |
| 2011/0198878 | A1 * | 8/2011 | Maley | A01K 3/001 256/10 |

* cited by examiner

*Primary Examiner* — Michael C Zarroli
(74) *Attorney, Agent, or Firm* — Calderone McKay LLC

(57) ABSTRACT

The invention includes a traveling gate grounding assembly having a traveling gate, a gate panel, and a conducting cable extending between attachment points on the gate panel. The traveling gate is electrically connected to the conducting cable. A floating ground having a grounding pulley, electrically connectable to a ground line is included. The conducting cable is slideably engaged with a wheel or sheave of the grounding pulley and electrically connectable to a ground line via the grounding pulley. Described also are traveling gate grounding systems to retrofit to a gate panel, including a conducting cable, a fastener for securing the conducting cable to a gate panel and a floating ground having the grounding pulley. The wheel or sheave when slideably engaged with the conducting pulley, is simultaneously electrically connectable to a ground line and the conducting cable. In use, the gate panel is in electrical communication with the floating ground.

24 Claims, 11 Drawing Sheets

24
32a
34
58
44
42
68
40
55
54
62
66
70
32b
82
86
52
51
56
50
48
57

CONTINUOUSLY GROUNDED TRAVEL GATE SYSTEM, BARRIER SYSTEM AND RELATED METHODS

CROSS REFERENCE TO RELATED APPLICATION

This application claims the benefit under 35 U.S.C. § 119 (e) to U.S. Provisional Patent Application Ser. No. 62/861,081, filed Jun. 13, 2019, and entitled "Continuously Grounded Travel Gate System, Barrier System and Related Methods," the entire disclosure of which is incorporated herein by reference.

BACKGROUND OF THE INVENTION

Electricity is produced at steam- or gas-fueled generating stations and is routed to electric substations for distribution to the areas they support. There are two types of substations—transmission and distribution. Both act as a transportation hub for power.

Transmission substations typically receive a 345,000-volt feed, which is stepped down or reduced through a transformer to 138,000 volts. Following this voltage reduction, power then is routed to a distribution substation. Distribution substations receive the 138,000-volt feed and continue to step it down further to supply the various distribution networks. When power leaves a distribution substation, voltage is proportionate to the requirements of the network it supports. Commercial voltages range from 277/460 volts, while standard residential voltage is 120/208 volts.

For safety reasons, each type of substation includes a grounding (earthing) system. To design a suitable grounding system, the total ground potential rise, and the gradients in potential during a fault (called touch and step potentials), must be calculated to protect passers-by during a short circuit in the transmission system. Earth faults at a substation can cause a ground potential rise. Currents flowing in the Earth's surface during a fault can cause metal objects to have a significantly different voltage than the ground under a person's feet; this touch potential presents a hazard of electrocution.

Where a substation has a metallic fence, it must be properly grounded to protect people from this hazard using a bonding or earthing system.

The function of an earthing and bonding system is to provide an earthing system connection to which transformer neutrals or earthing impedances may be connected in order to pass the maximum fault current. The earthing system also ensures that no thermal or mechanical damage occurs on the equipment within the substation, thereby resulting in safety to operation and maintenance personnel. The earthing system also guarantees equipotential bonding such that there are no dangerous potential gradients developed in the substation.

The earthing systems includes a below-ground grid that is generally made up of conductors that are generally bare copper bars, usually having a cross-sectional area of 95 square millimeters, and they are laid below ground at a shallow depth (e.g., about 0.25-0.5 m) in squares of about 3 to 7 meters. The metallic fences that are used for security and space-partitioning at the substation are generally bonded or grounded to this grid. However, many of these fences contain gates or access door which can be moved from a closed position to an open position to allow access to one side or the other of the fence barrier. Because these gates or door are often fabricated of metal or other conductive materials, they must be grounded as well. However, conventional designs of the gates or doors permit their reliable grounding only when fully open or fully closed, presenting a safety hazed when in transition between these states.

BRIEF SUMMARY OF THE INVENTION

The invention as described herein in includes a traveling gate grounding assembly that includes a traveling gate having a gate panel with a front surface, a conducting cable that extends from an initial attachment point on the gate panel to a terminal attachment point on the gate panel. The traveling gate is electrically connected to the conducting cable. Also included is a floating ground comprising at least one grounding pulley that is electrically connectable to a ground line, wherein the conducting cable is slideably engaged with a wheel of the grounding pulley and is electrically connectable to a ground line via the grounding pulley.

Also included are traveling gate grounding systems that can be retrofitted to a gate panel including a conducting cable, at least one fastener capable of securing the conducting cable to a gate panel; and a floating ground comprising at least one grounding pulley that is electrically connectable to a ground line and to the conducting cable, wherein a wheel of the grounding pulley is capable of being slideably engaged with the conducting pulley and is simultaneously electrically connectable to a ground line and the conducting cable; wherein, in situ, the gate panel is in electrical communication with the floating ground.

Barrier systems that include at least one barrier panel; and the traveling gate are also included as are methods of manufacturing the ground gate panel and/or a grounded barrier, that separates a first domain from a second domain, wherein the second domain is accessible to the first domain by movement of the grounded traveling gate from an open position to a closed position.

BRIEF DESCRIPTION OF THE SEVERAL VIEWS OF THE DRAWINGS

The foregoing summary as well as the following detailed description of embodiments of the invention may be better understood when read in conjunction with the appended drawings. It should be understood, however, that the invention is not limited to the precise arrangements and instrumentalities shown in the Figures. In the drawings.

DETAILED DESCRIPTION OF THE INVENTION

Figure 1:
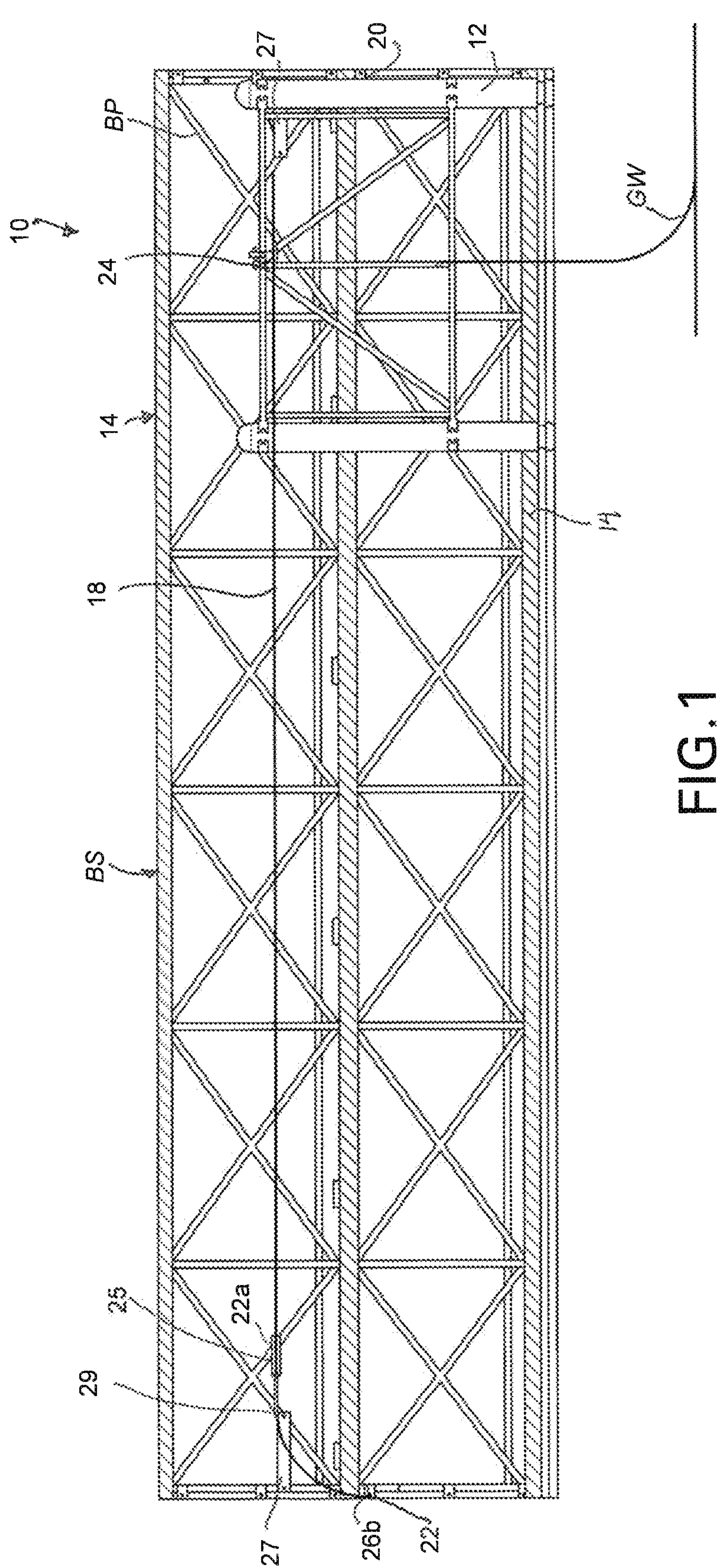
FIG. 1 is an elevational view of the traveling gate grounding assembly fitted onto a gate and barrier construction viewed from the back in an open position.
Figure 2:
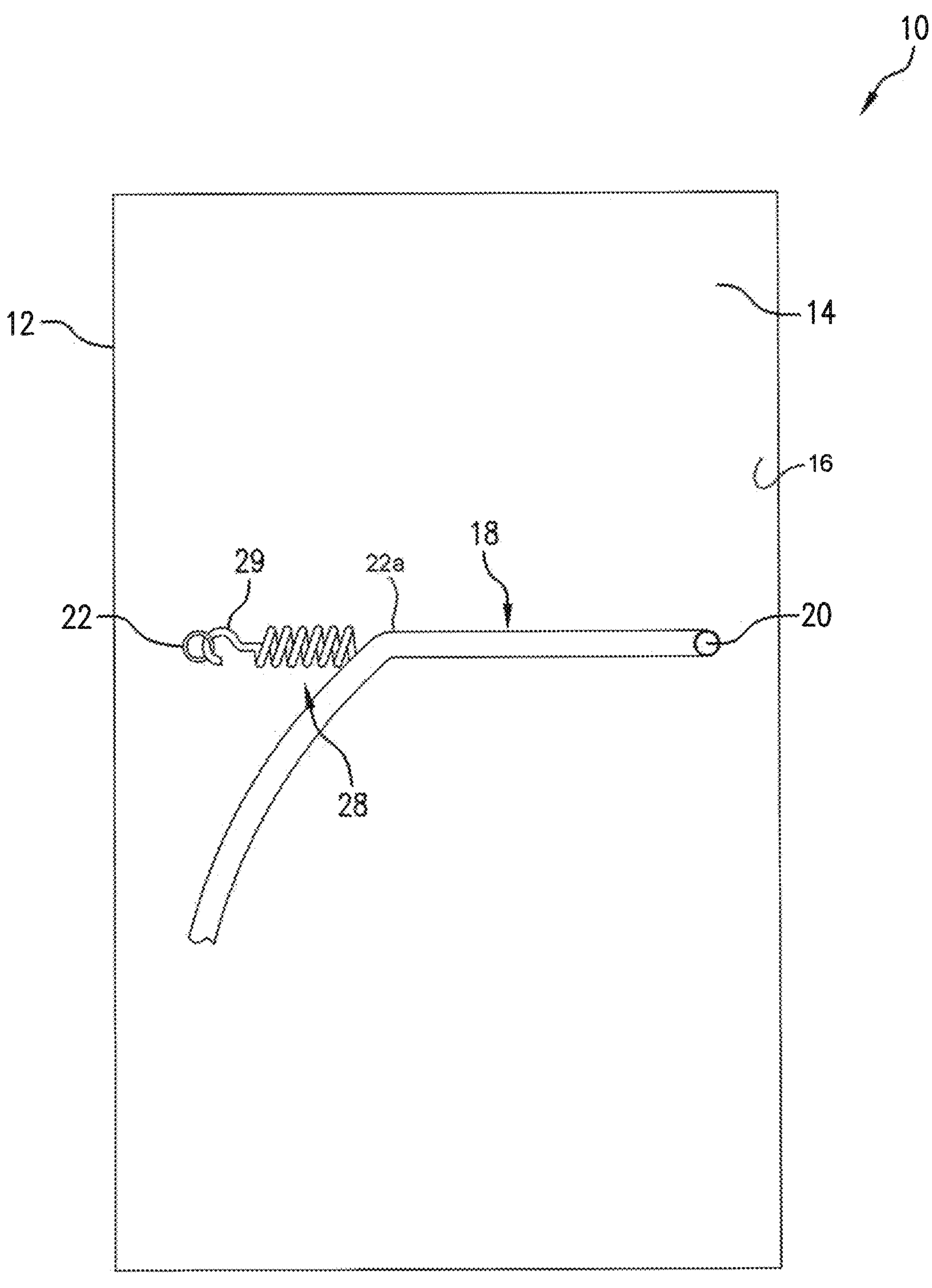
FIG. 2 is an illustrative representation of the traveling gate grounding assembly of the invention.

For some time, the only solution for grounding a typical sliding gate, such as a cantilever sliding gate, was by using a flexible grounding cable that would span half of the sliding gate length and connect from a grounded fence post to the frame. A big disadvantage of this is keeping the long flexible cable from dragging the ground. There have been several attempts and designs for keeping the flexible cable from hitting the ground and getting tangled up, but none have been wholly successful.

The invention as described herein addresses and overcomes this disadvantage. A key difference between the use of the prior art flexible grounding cable and the invention is how the bonding wire moves. In the practice of the invention, the bonding wire is bonded or otherwise attached to the gate frame using, for example, mounting angles, appropriate mounting hardware, and a collection of tension mechanisms to hold the bonding wire up and away from the cantilever gate frame (described below). A traveling grounding connector can be connected to the wire.

The invention includes a traveling gate that, when used with a barrier, is capable of moving from an open position to a closed position or vice versa while being continuously and reliably grounded. Also included are barriers systems that include the traveling gate assembly.

As is known in the utility industry, substations are generally built over a continuous, below ground grid composed of conductors. Such grid is part of the substation's earthing system and extends generally 5 to 30 feet beyond the perimeter fence of the substation. The perimeter fence and any other fences or barriers with the boundaries of the perimeter fence are grounded by being bonded to the grid. Each of these fences, however, may include a gate or door which is in a grounded state when closed or open, but remains ungrounded (and therefore potentially dangerous) when at an in-between state.

The assemblies and barriers described herein have readily apparent application in the barriers and fence systems commonly installed at electrical substations. However, their use in any environment where misdirected current may be a safety concern in contemplated, such as in factory, industrial or municipal settings, railroad or train cars, buses, helicopters, ships, etc.

The invention includes a traveling gate grounding assembly that addresses this problem, as the traveling gate of the assembly is able to remain in a grounded state continuously as it transitions from the open state to the closed state. Also included within the scope of the invention are TGGAs that do not include the traveling gate, but which can be fitted to a new, or retro fitted to an already installed, gate.

The TGGA, in one embodiment, includes a traveling gate, that itself includes at least one gate panel with a first surface. By "travelling", it is meant that the gate is capable of being moved a distance within a plane that is substantially parallel to its front surface. The plane may be vertical or horizontal depending on whether one wishes the gate to open ("travel") in an "up/down" direction, like a traditional residential garage door, or a "left/right" direction, like a sliding barn door. The distance may be sufficient to allow access to an area behind the gate, and will vary depending on the dimensions of the traveling gate and the nature of the access required, e.g., to allow access to, for example, a car, truck, construction equipment, a person, and the like.

The traveling gate may be specially designed for the TGAA or may be an ordinary gate commercially available for use in and barriers. It and/or the gate panel independently may be made of any materials and have any structure. For example, the traveling gate and/or gate panel independently may consist of a support framework of posts and/or cross bars faced with a fencing fabric such as conventional "chain link" fabric or metal sheeting. In an alternative, the traveling gate and/or gate panel may independently be a continuous or semi continuous plate, such as for example, a metal plate (with or without holes or perforations). More detailed embodiments/alternatives are described below with respect to the Figures.

The traveling gate includes a gate panel which may be integral with the traveling gate or which may be an additional element attached to or affixed to the traveling gate. The traveling gate bears at least two spaced apart attachment points; it may be preferred that these are sited on a front surface of the gate panel. However, other locations are contemplated as within the scope of the invention.

Extending from an initial attachment point to a terminal attachment point on the gate panel is a conducting cable. In some embodiments, it may be desirable that the conducting cable is attached at 3 or 4 or 5 or more points, depending on the specific design of the traveling gate and/or the conditions under which it is used. Attachment of the conducting cable to the traveling gate via these points may be accomplished in any way known or developed in the art, e.g., hooks, loops, etc.; illustrative structural mechanisms are provided infra.

In most embodiments, it is desirable that that conducting cable extends directly across the gate panel, that is, that the attachment points are all located in the same plane in space, so that when the gate is viewed from the front, the conducting cable appears to be "straight" in either the horizontal or vertical direction (whichever was selected) relative to the base substrate, such as for example, the earth. The conducting cable may extend across a portion of, or the entire dimension of the traveling gate.

The traveling gate may further include structures which facilitate its movement from the open position to the closed position. For example, either of or both of the top or bottom of the gate may bear wheels or ball bearings that facilitate the gate's travel on the substrate or, e.g., a track assembly or a slidable tongue-in-groove arrangement.

The traveling gate is electrically connected to the conducting cable; this may be accomplished indirectly via the connection at the attachment points, by an additional conducting connecting structure, and/or by at least a portion of the conducting cable being in direct contact with at least a portion of the gate.

Depending on the structure and scale of the floating ground that is used in the TGGA (discussed below), it may be preferred that the conducting cable is attached to the panel such that the surface of the conducting cable is spaced apart a distance from the front surface of the gate panel. For example, the distance may be, e.g., about 1 to about 20, about 5 to about 15, or about 7 to about 12 inches.

In an alternative embodiment, the conducting cable extends across a channel or inset formed in the surface of the gate panel.

In most embodiments it may be preferred that the conducting cable remains substantially taut, i.e., lacking substantial slack, along the front panel gate to ensure that the floating ground is able to slide unhindered along the conducting cable when the traveling gate is moved from the open position to the closed position, and vice versa. Maintenance of a taut state may be maintained by any device known or to be developed in the art. In an example, the conducting cable includes at least one coil spring to ensure tautness. The spring(s) may be at either end of the cable and/or interposed within the cable (i.e., segments of cable connected by one or more coil springs). Alternatively, and as is shown in the examples herein, the cable may be attached to a one or more coil springs via, e.g., a bracket assembly, at one end or at its mid-portions. In another example the conducting cable may be made of a rigid material (essentially, a bar, rail or "shelf like" structure affixed to or extending from the front panel) and/or may be continuously affixed to the front panel. Further illustrative details on this aspect of structure are provided infra.

The conducting cable may be made of any conductive material known or to be developed in the art. Steel or copper cladded steel may be preferred. As alluded to above, the conducting cable may be flexible or rigid, or anything in between. The dimension of the conducting cable will vary depending on the structure of the floating ground with which it is engaged. Preferably, if the conducting cable is a flexible cable, it may have diameter of about 0.25 to about 1 inch or about 0.5 inches.

The TGGA further includes, with reference to the Figures, a floating ground 24. The floating ground includes at least one grounding pulley 32, which in turn includes a wheel or sheave, such as sheave 36. The outer rim of the wheel (or annular groove 38 of the sheave 36) is slideably engageable to the conducting cable, and vice versa. The term "slideably engageable," or grammatical variation of the same as used herein, means that when the outer rim of the wheel (or annular groove of the sheave) is contacted to the cable and a force is applied, the wheel or sheave will rotate along the pin of the pulley, allowing the surface of the cable to move through the pulley while the surface of the cable remains substantially in contact, and therefore in electrical connection, with the outer rim of the wheel (or groove of the sheave) of the grounding pulley.

The floating ground may further include one or more elements that serve, in use of the TGGA, to stabilize and/or secure the slideable engagement of the grounding pulley to the conducting cable, such as a tension maintaining element 51. Further details are provided infra in the description of the illustrative embodiments.

The floating ground is electrically connectable to one or more ground wire directly or indirectly. Such connection may be direct or indirect. In some embodiments the floating ground may include a ground member that is adapted to connect the ground wire to the floating ground. The ground member may be, for example, a bar, a hook, a flange, a lip, a loop or loops, a clamp, a clasp, buckle, anchor or fastening.

In the practice of the TGGA, the floating ground is stationarily fixed relative to the traveling gate so it "floats" in space relative to the gate. Any way of accomplishing this is acceptable as long as the floating ground remains capable of engaging with and remaining in electrical connection with the conducting cable—for example, the floating ground can be affixed to a post or pole, a portion of an adjacent structure, such as a wall or roof.

The ground wire may be any known or commonly used in the art. In practice, the ground wire (i.e., a ground line) GW is attached to a suitable ground. In the context of a substation, a suitable ground may include the earthing system of the substation, specifically, for example, the below ground grid of the earthing system.

The setup of the system is as follows. On the opening side of the gate frame, two aluminum angles would be attached to the frame to help position the tensioning angle bracket to the frame I a fixed position. One end of the utility wire would be attached to this bracket with grounding U-bolts. To hold the tension on the wire, an aluminum angle would be attached to the other side of the gate frame. Off this aluminum angle, a drawbar spring, turnbuckle, and piece of aluminum flat bar with grounding U-bolts would be attached in pair to hold the tension on the utility traveling wire. In part, as the gate frame moves from one end to the other, so will the utility wire as it is held well above the ground. Also, on this end of the gate frame, the utility wire would continue from the aluminum flat bar and connect to a two-piece ground connection that is attached to the aluminum gate frame. With the utility wire in tension and bonded to the gate frame, the traveling ground would attach to the wire by pulling the tensioning wheel back and attaching it with all wheels making contact on the wire. The traveling ground would be suspended from the bottom of the top horizontal sliding gate support frame. This would be accomplished with the use of compression springs that sandwich the traveling ground on a vertical (bolt/rod) mounding hardware. From there, a braided grounding strap would be attached to the tail end of the traveling ground body. The end of this grounding strap would then be attached to the cantilever sliding gate support frame. On this frame a two-piece grounding clamp would also be attached with the tail end of a 19/9 copper clad lead that is grounded to the grounding grid of the substation.

Overall, there are several advantages of invention, such as, keeping the main utility bonding wire from touching the ground, preventing the utility wire from binding and fatigue, as well as provides a shorter path to ground. It can be made/sold in several retrofit and/or manufactured options.

Figure 3:
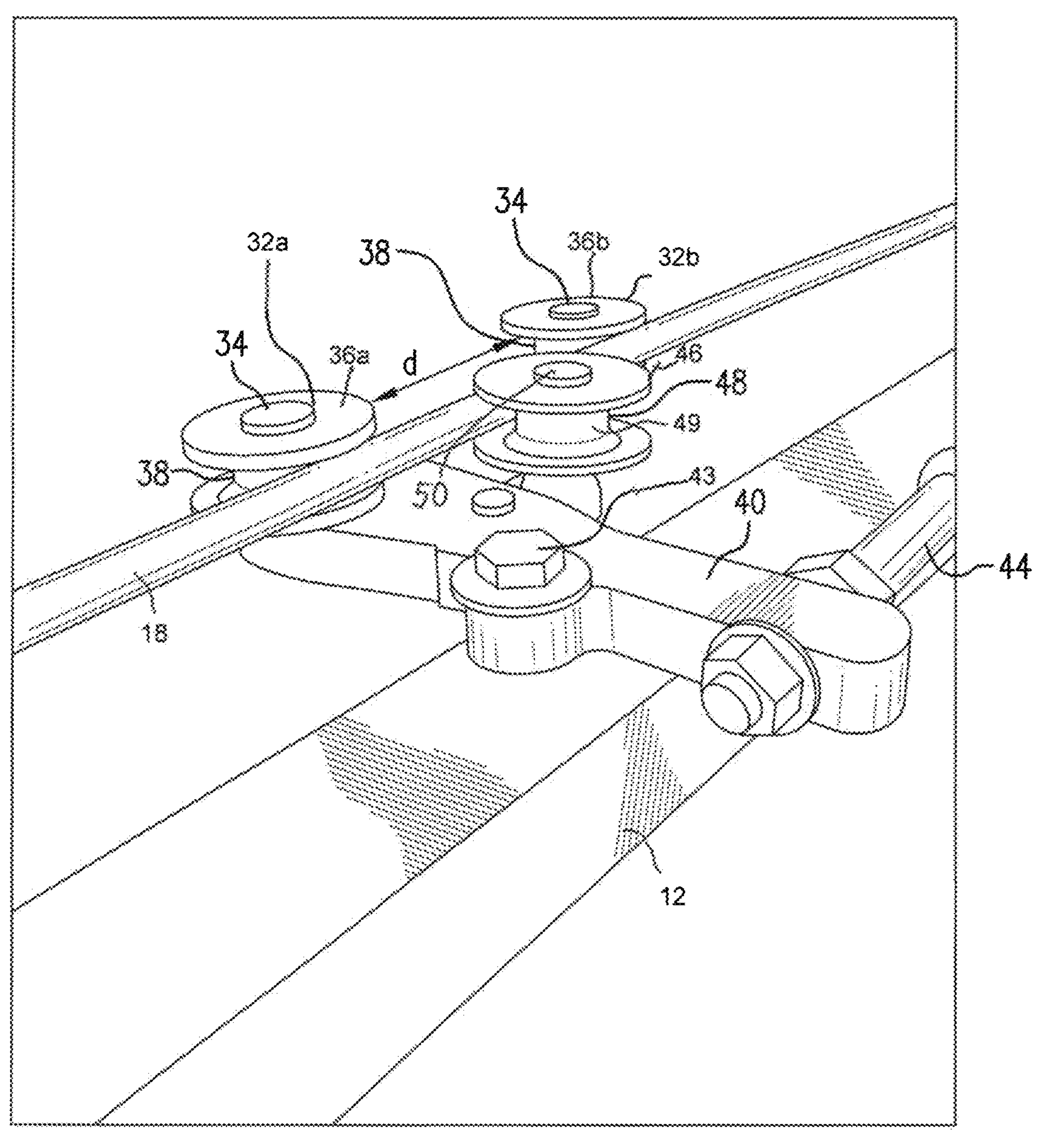
FIG. 3 is an upper perspective view of the floating ground engaged with the conducting cable.
Figure 4:
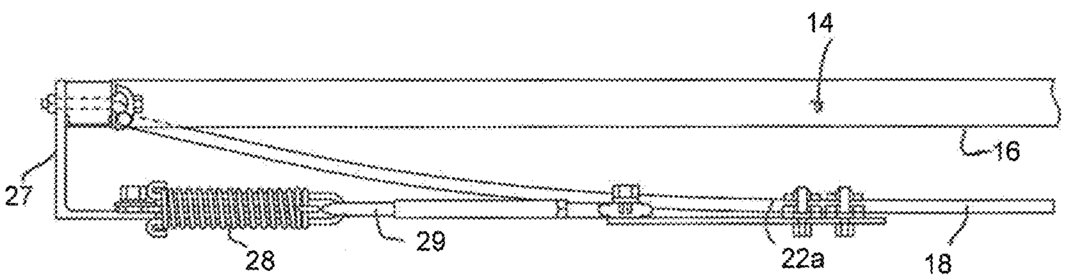
FIG. 4 includes a top elevational view and a front elevational view of a portion of the traveling gate grounding assembly of FIGS. 2 and 3, showing the engagement of the floating ground and the cable as well as the top edges of the gate panel (frame) and the floating ground support.
Figure 4:
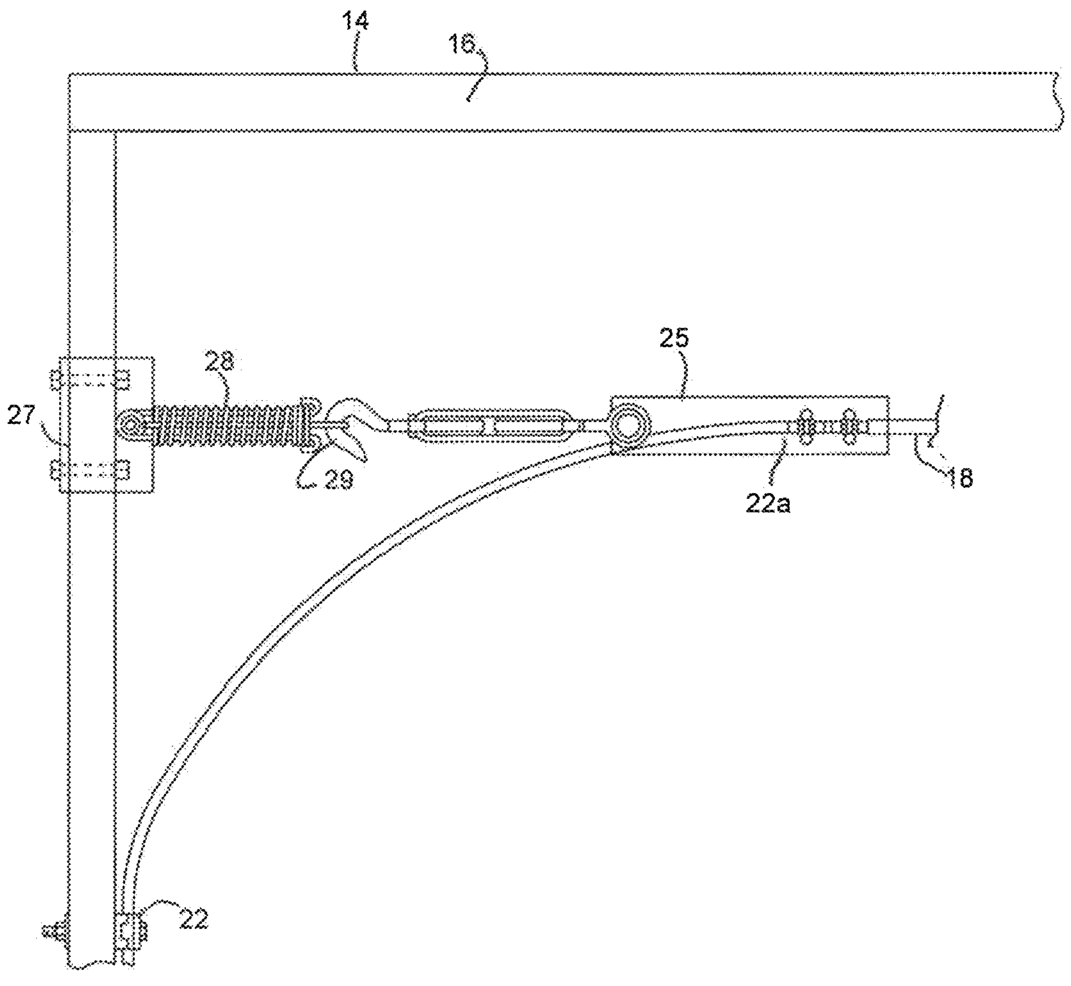

With reference to FIGS. 1, 2, 3 and 4 a basic embodiment of the traveling gate grounding assembly 10 of the invention includes a traveling gate 12 (FIG. 2) and a floating ground 24 (FIG. 3). The traveling gate 12 includes a gate panel 14 that, in this example, is integral to the traveling gate 12. The gate panel 14 has a front surface 16 upon which are located an initial attachment point 20 and a terminal attachment point 22.

Extending from attachment point 20 to terminal attachment point 22 is a conducting cable 18. In this embodiment, a bracket (not shown) at the initial attachment point 20 extends about 6 inches from the front surface 16 of the gate. The first end 26*a* of a conducting cable 18 is bolted to the distal end of the bracket (such that the conducting cable 18 is maintained about 24 inches from the gate front surface 16. The conducting cable 18 extends horizontally to the terminal attachment point 22. In this embodiment, an intermediate portion 22*a* of the conducting cable 18 is attached to a coil spring 28 via a bracket 25. The coil spring 28 terminates in a hook structure 29. The hook structure 29 is hooked to a device (not visible in FIG. 1) sited at the terminal attachment point, such as a loop, bar or second hook structure, so that the conducting cable 18 spans the gate panel 14 substantially horizontally and remains taut over time.

Similar to the bracket 27 at the initial attachment point 20, the terminal attachment point 22 is devised to maintain the conducting cable 18 spaced apart from the gate panel surface 16. In most embodiments, the conducting cable 18 will be spaced apart from the gate panel surface 16 for substantially the same distance along its entire length; in any case, the conducting cable 18 must under no circumstances be positioned to come in contact with the gate panel 14.

The traveling gate grounding gate assembly 10 also includes a floating ground 24 that engages the conducting cable as is shown in, e.g., FIG. 3. In this embodiment, the floating ground 24 includes two grounding pulleys 32, identified as ground pulleys 32*a* and 32*b*, each having a sheave 36 with an outer groove 38 that slidably engages the conducting cable 18 and an axle 34. Each of the sheaves 36 (a and b) of the grounding pulley 32 is rotatably affixed to a frame 40 by an axle 34 (top only visible) that extends through a hole 42 (not visible) at the center of the wheel 36 spaced apart from one another by a distance (d) of about 3.5 inches. Each of the grounding pulleys 32 (a and b) is in electrical communication with a ground wire, either directly or indirectly.

The frame 40 also includes a ground member 44, to which a ground wire(s) GW may be attached. A portion of the frame 40 defines a hole (not visible) by which the frame 40 is attached using a, e.g., bolt 43 (top only visible) to a support (not shown).

In the embodiment shown in FIG. 3, the floating ground 24 further includes an optional stabilizer pulley 46, made up of a sheave 48 and an axel 50. In this embodiment, the stabilizer pulley 46 is located between and equidistant from each of the grounding pulleys 32, and on the opposite side of the conducting cable 18. The groove 49 of the stabilizer sheave 46 slidably engages the conducting cable 18 as the gate is moved. The stabilizer pulley's axel 50 extends through a hole 57 the center of the sheave 46 to rotatably affix it to a spring-tensioned arm 52 (not visible in FIG. 2, see FIGS. 5, 6, 7), which itself is affixed to the frame 40. Specifically, the spring tensioned arm 52 is pivotably attached at its proximal end 74 to the frame 40. In this embodiment, the axel 50 passes through a hole 82 in the arm 52 and a corresponding hole 84 in the frame 40 at the proximal end 74 of the spring tensioned arm 52 to provide for the pivotable attachment 85.

The pivoting action of the spring tensioned arm 52 around the axel 50 is restricted by use of an axel spring 86 sited around the axel 50 which creates an adjustable force that "givably" pushes the spring tensioned arm 52 against the conducting cable 29 to ensure that is does not disengaged from the grounding pulleys.

The spring tensioned arm serves to adjustably apply an adjustable tensioning force to "push" the stabilizer pulley against the conducting cable in opposition to the force applied by the fixed location grounding pulleys. In various embodiments this arrangement may be reversed so that the adjustable tensioning force is applied by one or both grounding of the pulleys, and the fixed force is applied by the stabilizer pulley. Other arrangements may also be used.

Figure 5:
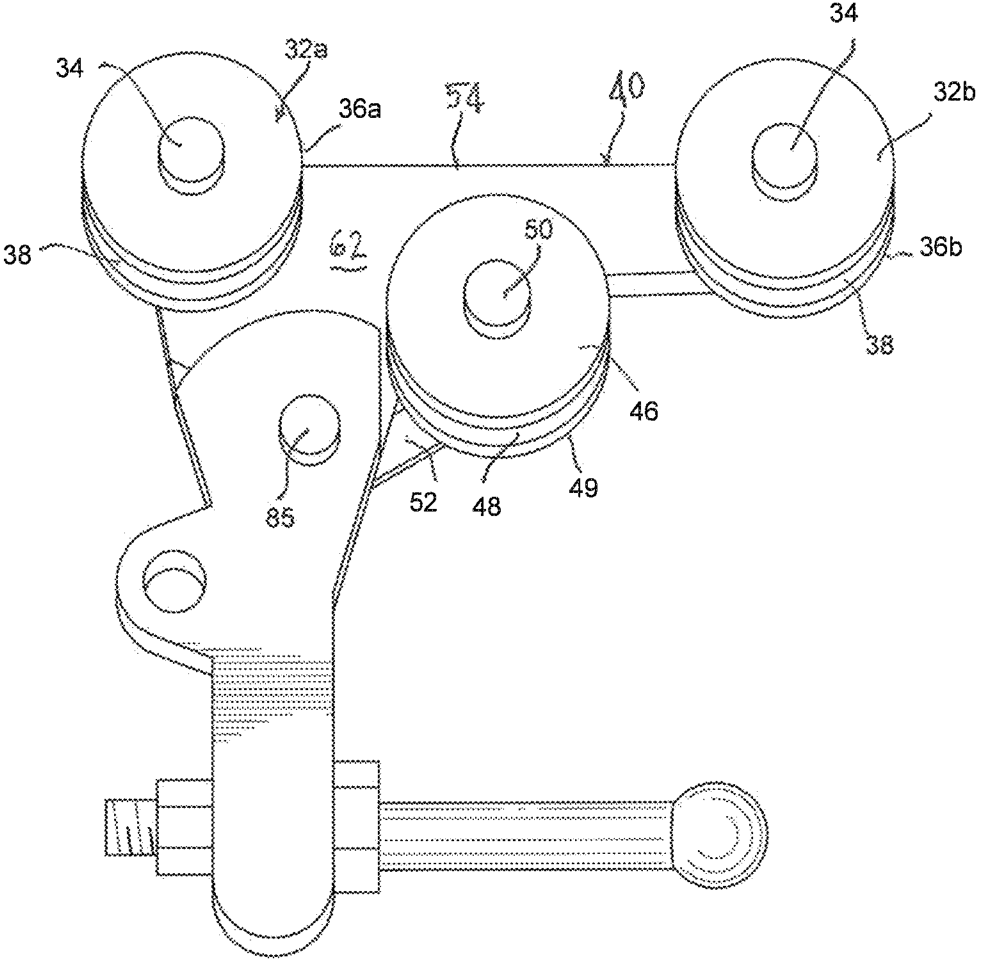
FIG. 5 is a perspective view of the top side of the floating ground of FIG. 2.
Figure 6:
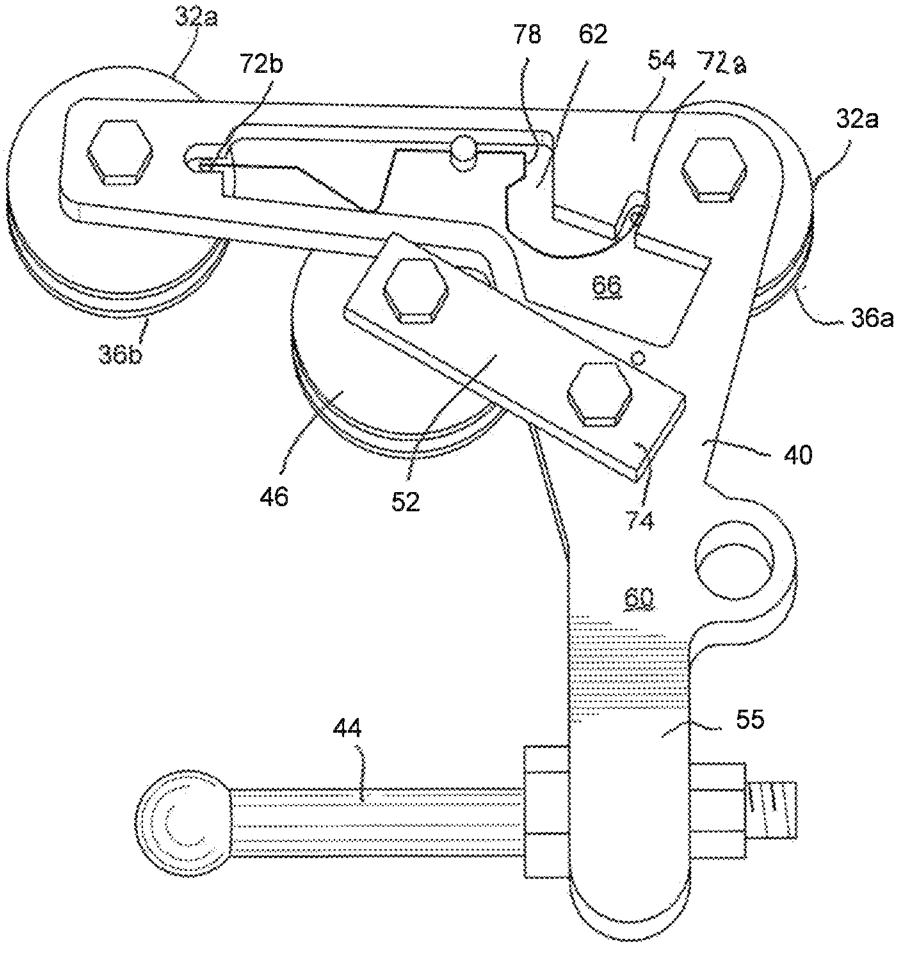
FIG. 6 is a perspective view of the bottom side of the floating ground of FIG. 2.
Figure 7:
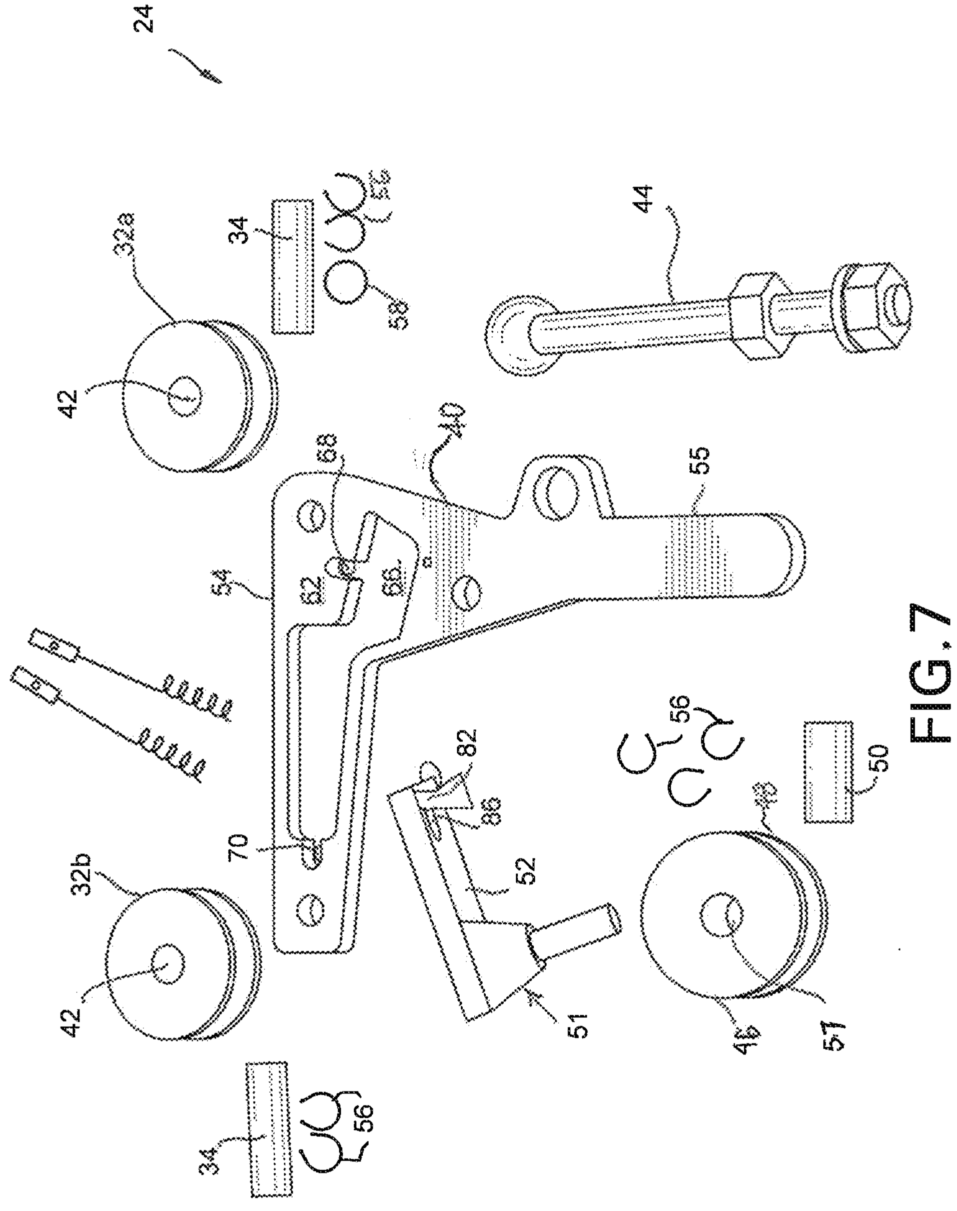
FIG. 7 is an exploded view of the floating ground that is a component of the traveling gate grounding assembly that is shown in FIGS. 1, 2 & 3.
Figure 8:
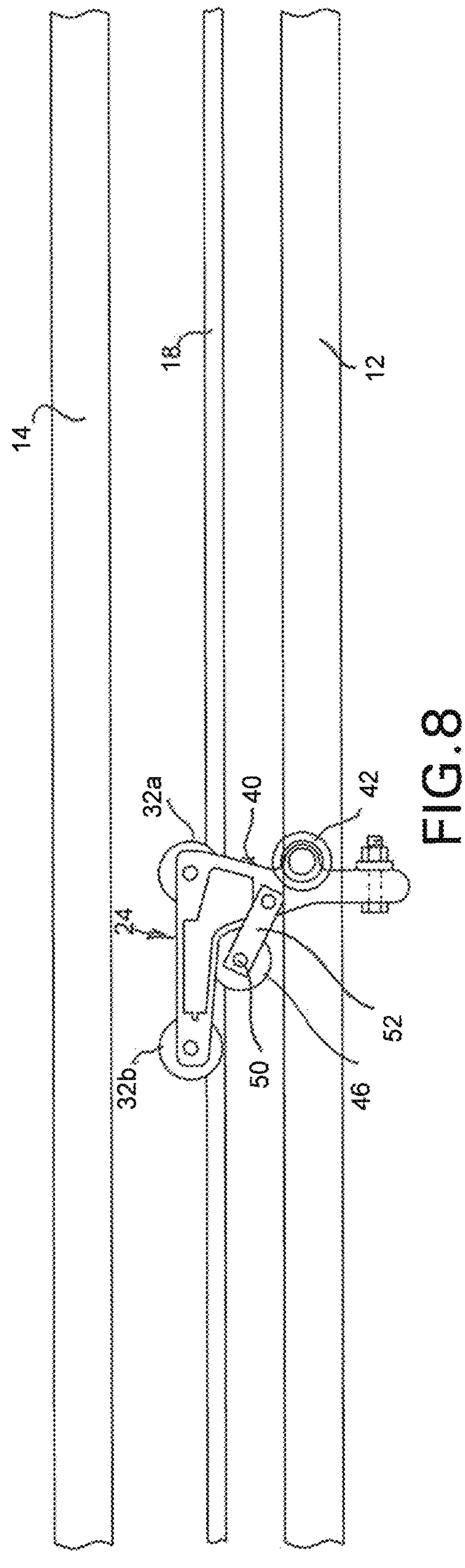
FIG. 8 is a bottom view of an embodiment of the traveling gate grounding assembly of the invention showing in situ the relative positions of the gate frame, the support and the floating ground of FIG. 5.

FIGS. 5, 6, and 7 show an illustrative embodiment of a floating ground 24 of FIG. 3. FIG. 5 is a top view; FIG. 6 bottom view and FIG. 7 is an exploded view. In this embodiment, the floating ground 24 includes a frame 40 and two grounding pulleys 32*a*, 32*b*. The frame 40 is composed of a first arm 54 and a second arm 55 which are attached to one another at their ends to form an approximately 90-degree angle between them. The two grounding pulleys are rotatably affixed at opposite ends of the top surface 62 first arm 54 via an axle 34*a*, 34*b* that passes through the center of the sheaves 36*a*, 36*b* of the grounding pulleys 32*a*, 32*b*. The axles 34*a*, 34*b* are held in place by snap rings 56 and washers 58 which are positioned around the ends of the axels where they extend from the top and the bottom of the sheaves.

The frame 40 has a bottom surface 60 that defines a cavity 62 in the first arm 52 that extends from directly underneath a portion of the sheave 36*a* of the first grounding pulley 32*a* to underneath a portion of the sheave 36*b* of the second pulley 32*b*. The floor 66 of the cavity 62 contains a first hole 68 and a second hole 70 each which extends from the cavity floor 66 to the top surface 62 of the first arm 52 of the frame 40. The first hole 68 is located under the first conducting sheave 36*a* and the second hole 70 is located under the second conducting sheave 36*b*. Disposed partially within and extending from each hole 68, 70 is a copper cylinder (72*a* and 72*b*), which extends from the top surface 62 of the frame 40 to the bottom surface 74 of the conducting sheave 36. The copper cylinders 72*a*, 72*b* are each attached to a coper wire 78 that is in turn affixed within the cavity 62 by a small bolt (not visible) to the frame 40); this ensures substantially continuous electrical communication between the copper cylinder and the frame. Also, in this embodiment, the bottom portion (not visible) of the copper cylinder 72 that is disposed within the hole (68 or 70) is encircled by a coil spring (not shown), which permits the copper cylinder 72 to "give" as the conducting sheave is rotated to ensure substantially continuous electrical communication between the conducting cable 18 and the frame 40 (via the sheave, copper cylinder, and copper wire).

Figure 9:
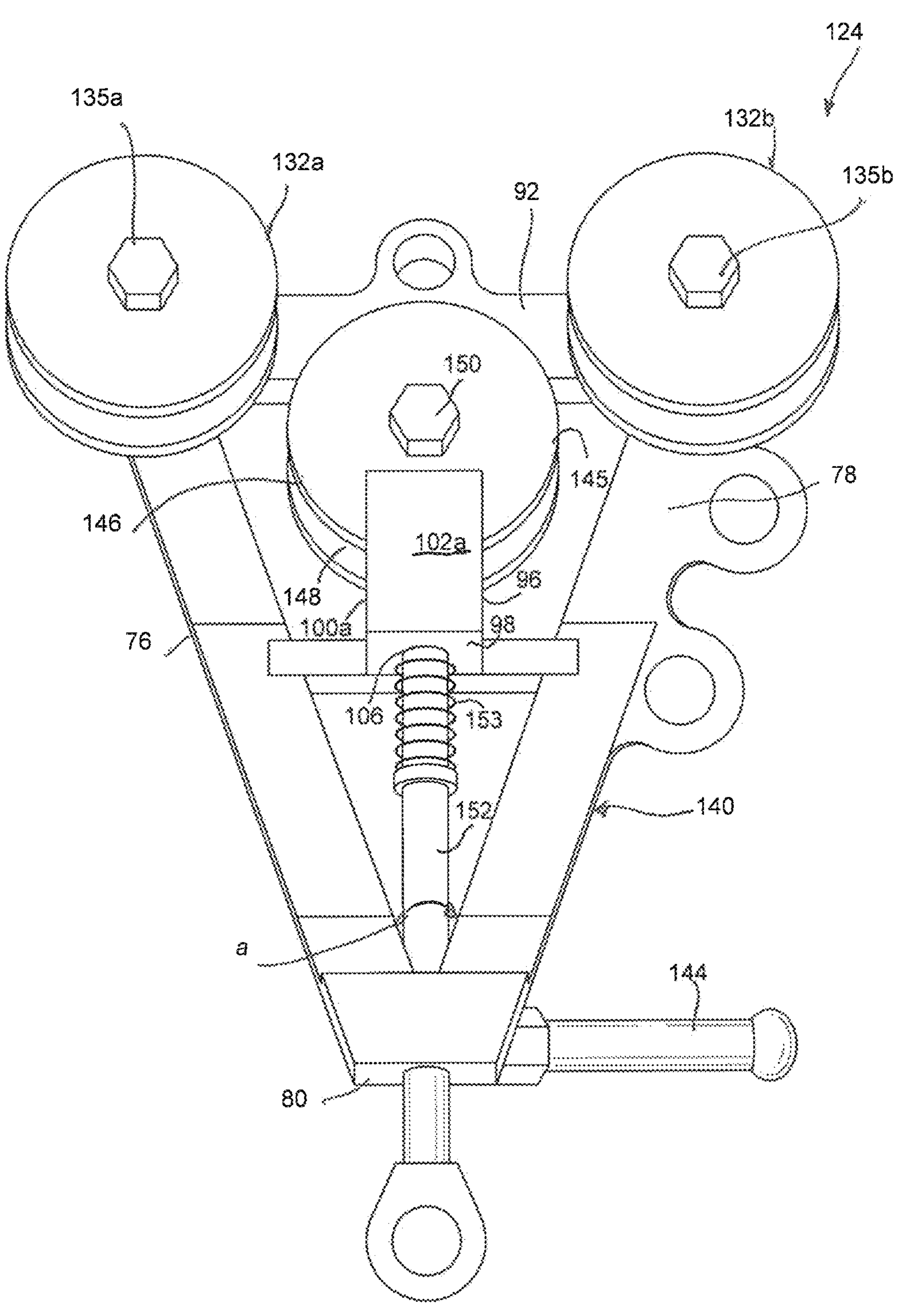
FIG. 9 is a top perspective view of an alternative embodiment of a floating ground.
Figure 10:
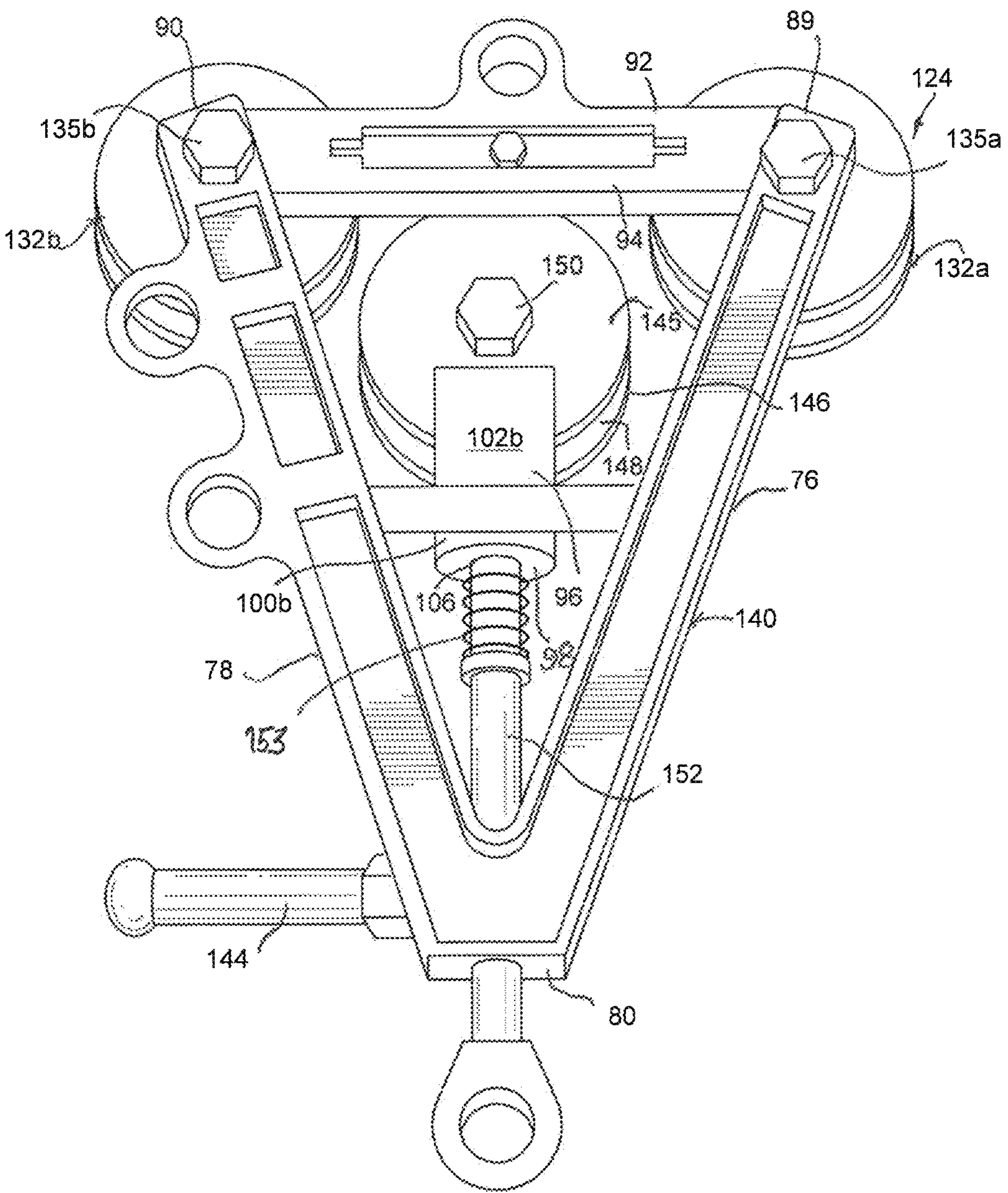
FIG. 10 is a bottom perspective view of the floating ground of FIG. 9.
Figure 11:
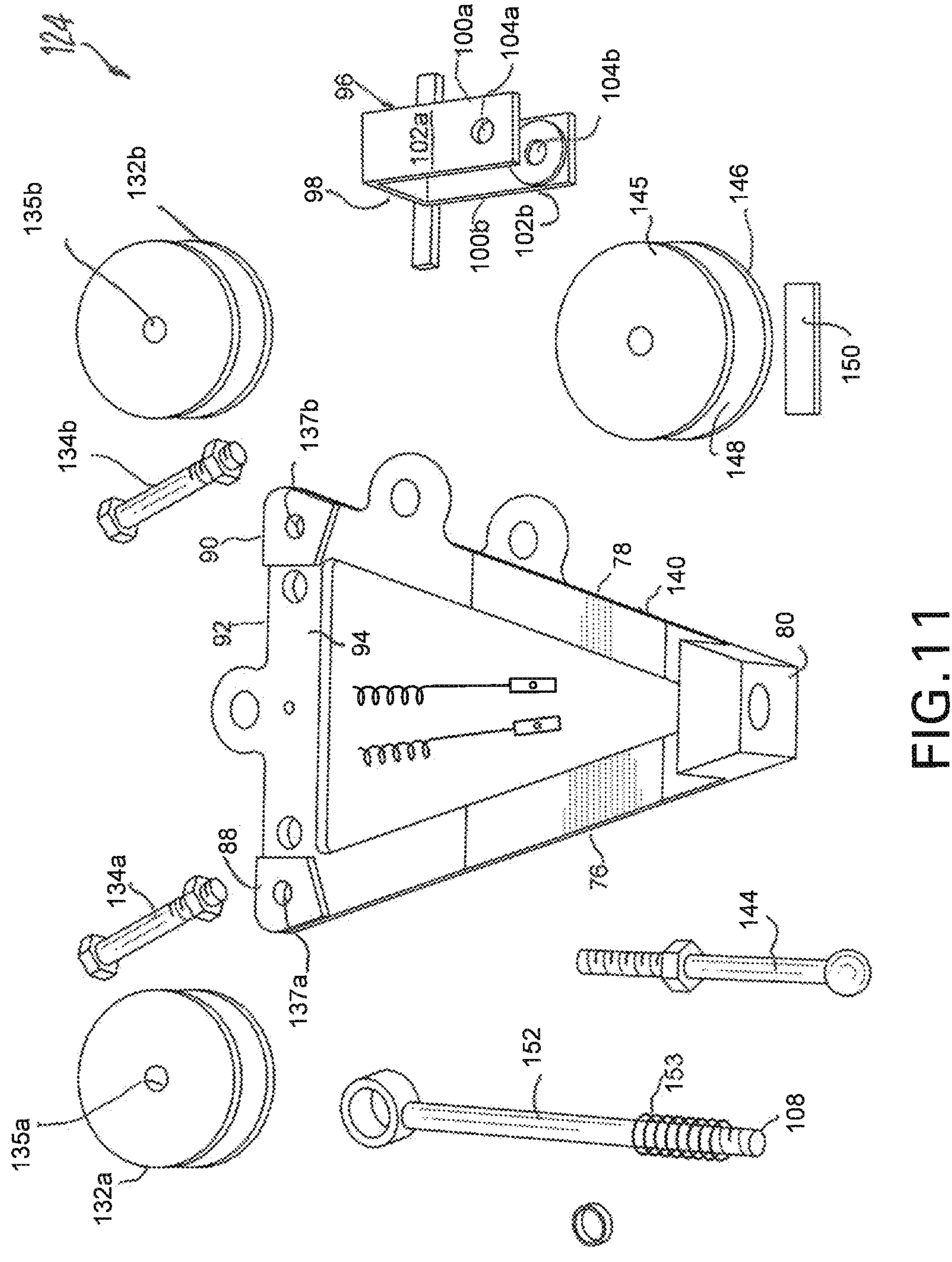
FIG. 11 is an exploded view of the floating ground of FIG. 9.

With reference to FIGS. 9, 10 and 11, an alternative embodiment of a floating ground 124 is shown. Floating ground 124 includes a frame 140 which is formed of a first arm 76 and a second arm 78 each of approximately equal length extending from a frame base 80 and spaced apart so as to form between them an angle of about 30 to about 50 degrees (about 45 degrees in the embodiment shown). At the ends of the arms 76 and 78 opposite of the frame base 80 end, the distal ends 88 and 90 of the arms 76 and 78 are connected by a cross bar 92.

At each of the distal ends 88 and 90, a grounding pulley 132*a*, 132*b* is rotatably attached. The pulleys 132*a*, 132*b* are attached in the manner described above, using axels 134*a* and 134*b* which are threaded through holes 135*a*, 135*b* in the pulleys and corresponding holes 137*a*, 137*b* in the frame 140, and secured with snap rings.

A spring tensioned arm 152 extends from the frame base 80 to a distal end, which bears a heli-coil 153 that provides the spring tension. To the distal end 94 of the cross bar 92 is rotatably attached a stabilizer pulley 145, which includes a stabilizer sheave 146 with a radial groove 148, and a stabilizer axel 150. The tensioned arm terminates in a yoke 96 made up of a center portion 98 and two spaced apart members 100*a*, 100*b*, each of which has an outer surface 102*a*, 102*b* that defines a hole 104*a*, 104*b*. The yoke center portion 98 defines a hole 106 through which the distal end 108 of the spring tensioned arm 152 is inserted (in this embodiment, secured by a snap wing and washers).

The stabilizer sheave 146 is rotatably attached to the spring tensioned arm 152 via the yoke 96, that is the stabilizer axel 150 is inserted through the holes 104*a*, 104*b* and secured with snap rings. In this embodiment, the frame 140 includes a grounding member 144 extending from the frame base 80 to which a ground wire may be attached. Other embodiments of the floating ground may be contemplated.

Also included with the scope of the invention is a traveling gate grounding system that can be retrofitted to an existing gate panel. The gate panel may be already installed in a fence or barrier or may be retrofitted with the traveling gate grounding system described herein prior to the installation of the gate. The traveling gate grounding system include the embodiments described above, minus the gate panel, for example, at minimum, the conducting cable; at least one fastener capable of securing the conducting cable to a gate panel and the floating ground(s) described above. Any other fasteners or connecters required to physically affix the system to the gate panel and/or place the gate panel in electrical communication or connection with a ground line (which itself is electrically connectable to a ground) may also be included. Such fasteners/connectors may be, for example, those listed in FIG. 12.

The system described herein may be applied to a barrier system BS, that is, for example, a series of fence panels and a gate panel which can be used together to create a partitioned space. The barrier system may include at least one barrier panel BP, such as for example, a fence panel made of at least two uprights and a fencing fabric, such as mesh or chain link and the traveling gate system as described herein in any embodiment. The traveling gate system may be slidably affixed to at least one barrier panel to allow or deny access to the partitioned off area, depending whether the gate panel ins in the open or the closed position. In other embodiments, the gate panel may be installed on spatial proximity to but not directly affixed to the barrier panel(s). For example, the gate panel may be installed on a standalone in ground or overheard track is close proximity to the barrier panels.

Methods of manufacture/fabrication of the barrier system and the traveling gate grounding assembly are also included within the scope of the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A traveling gate grounding assembly comprising:

(i) a traveling gate comprising a gate panel having a front surface;

(ii) a conducting cable extending from an initial attachment point on the gate panel to a terminal attachment point on the gate panel, wherein the traveling gate is electrically connected to the conducting cable;

(iii) a floating ground comprising at least one grounding pulley that is electrically connectable to a ground line, wherein the grounding pulley has a wheel and maintains contact between an edge of the wheel and the conducting cable through a tension maintaining element which is able to engage and exert force against the conducting cable so the conducting cable remains electrically connected to the wheel; and wherein the conducting cable is slideably engaged with the wheel of the grounding pulley and is electrically connectable to a ground line via the grounding pulley.

2. The assembly of claim 1 further comprising a ground wire that is electrically connectable to a ground.

3. The assembly of claim 1 wherein the gate panel comprises a gate frame and a gate fabric.

4. The assembly of claim 1 wherein the conducting cable comprises a steel.

5. Assembly of claim 1 wherein the conducting cable comprises a cladding comprising copper.

6. The assembly of claim 1 wherein the conducting cable extends substantially the entire X-dimension of the gate panel.

7. The assembly of claim 1 wherein the conducting cable has a diameter of about 0.25 inches to 1 inch.

8. The assembly of claim 1 wherein the conducting cable has a diameter of about 0.5 inches.

9. The assembly of claim 1 wherein the floating ground comprises at least two grounding pulleys, each of which is electrically connected to a ground line.

10. The assembly of claim 1, wherein the wheel of the grounding pulley is a sheave having an edge groove, and the conducting cable is engaged at least partially in the edge groove of the sheave.

11. The assembly of claim 1 wherein the grounding pulley further comprises a frame, and the wheel of the grounding pulley is rotatably affixed to the frame.

12. The assembly of claim 10 wherein the wheel of the grounding pulley has an opening therethrough and the wheel is affixed by an axle that extends from a surface of the frame through the opening in the wheel.

13. The assembly of claim 10 wherein the frame comprises a ground member that is electrically connectable to the ground line.

14. The assembly of claim 1 wherein the tension maintaining element comprises a spring-loaded tension arm extending from the grounding pulley, the tension arm comprises a tension pulley rotatably affixed to the tension arm and the tension pulley engages the conducting cable to maintain the electrical connection of the wheel of the grounding pulley to the cable.

15. The assembly of claim 14 wherein the tension pulley comprises a wheel, and the wheel of the grounding pulley and the wheel of the tension pulley each engage the conducting cable on opposite sides of the cable relative to one another.

16. The assembly of claim 1 wherein the floating ground is affixed to a support.

17. A barrier system comprising:

(i) at least one barrier panel; and (ii) the traveling gate system of claim 1;

wherein upon installation of the barrier system in situ, the gate panel is engaged to the barrier panel, and can slide from an open position to a closed position.

18. The barrier system comprising of claim 17 wherein upon installation of the barrier system in situ, the at least one barrier panel is situated behind, spaced from and vertically parallel to the gate panel.

19. The barrier system of claim 18 wherein the traveling gate is slidably engaged to the barrier panel by a device comprising a track.

20. The barrier system of claim 19 wherein the track is mounted on a back surface of the traveling gate.

21. The barrier system of claim 19 wherein the track is mounted on a front surface of the barrier panel.

22. The barrier system of claim 17 wherein the gate panel is slidably engaged to a substrate.

23. A method of manufacturing a grounded barrier that separates a first domain from a second domain, wherein the second domain is accessible to the first domain by movement of a traveling gate from an open position to a closed position comprising the barrier system of claim 17.

24. A traveling gate grounding system that can be retrofitted to a gate panel comprising:

(i) a conducting cable;

(ii) at least one fastener capable of securing the conducting cable to a gate panel;

(ii) a floating ground comprising at least one grounding pulley that is electrically connectable to a ground line and to the conducting cable, wherein a wheel of the grounding pulley is capable of being slideably engaged with the conducting pulley and is simultaneously electrically connectable to a ground line and the conducting cable;

wherein, in situ, the gate panel is in electrical communication with the floating ground.

* * * * *